United States Patent [19]

Salzburg et al.

[11] Patent Number: 4,476,253

[45] Date of Patent: Oct. 9, 1984

[54] PROCESS FOR THE PREPARATION OF POLYURETHANE ELASTOMERS USING DIOLS OF THE ANHYDRO-TETRITOL SERIES

[75] Inventors: Herbert Salzburg, Cologne; Holger Meyborg, Odenthal; Wilhelm Goyert, Leverkusen; James M. Barnes, Wermelskirchen, all of Fed. Rep. of Germany

[73] Assignee: Bayer Aktiengesellschaft, Leverkusen, Fed. Rep. of Germany

[21] Appl. No.: 570,045

[22] Filed: Jan. 11, 1984

[30] Foreign Application Priority Data

Jan. 27, 1983 [DE] Fed. Rep. of Germany ....... 3302603

[51] Int. Cl.$^3$ ............................................. C08G 18/14
[52] U.S. Cl. ................................... 521/176; 521/174; 528/73
[58] Field of Search ................... 521/176, 174; 528/73

[56] References Cited

U.S. PATENT DOCUMENTS 4,383,051  5/1983  Meyborg et al. .................. 521/176

FOREIGN PATENT DOCUMENTS 0052295  5/1982  European Pat. Off. .

OTHER PUBLICATIONS

J. Organic Chem., 26, 1673, (1961), F. H. Otey et al.
Nachr. Chem. Techn. Lab. 30, 206-206, (1982), by H. U. Woelk.
Kunststoff-Handbuch, vol. VII, Vieweg-Hochtlen, Carl Hanser-Verlag, Munich, 1966, p. 206.

*Primary Examiner*—Maurice J. Welsh
*Attorney, Agent, or Firm*—Gene Harsh; Joseph C. Gil; Lyndanne M. Whalen

[57] ABSTRACT

Polyurethane elastomers are made by reacting organic polyisocyanates with compounds having at least two groups containing isocyanate-reactive hydrogen atoms and a molecular weight of from 400 to 10,000 and a 1,4-monoanhydro-tetritol in accordance with techniques known to those in the art. Known chain-lengthening agents, auxiliaries and additives may be included in the reaction mixture. The reaction mixtures employed in the process of the present invention have a longer pot life than prior art reaction mixtures. The elastomers produced by this process are shrink stable.

8 Claims, No Drawings

PROCESS FOR THE PREPARATION OF POLYURETHANE ELASTOMERS USING DIOLS OF THE ANHYDRO-TETRITOL SERIES

BACKGROUND OF THE INVENTION

The present invention relates to a process for the preparation of polyurethane elastomers in which 1,4-monoanhydroerythritol and/or 1,4-monoanhydrothreitol is (are) used as bifunctional chain lengthening agents.

Monoanhydro-tetritols may be obtained in excellent yields by processes known in the literature. In one such process, a tetritol is heated in the presence of heterogeneous, acid ion-exchange resins to temperatures below 160° C. 1,4-monoanhydroerythritol may be obtained in 94 to 98% yield from solvent-free erythritol at 140° C. under vacuum (see F. H. Otey et al, J. Org. Chem., 26, 1673 (1961)). This monoanhydrotetritol has been suggested as a possible starter diol for epoxides in the production of hydroxypolyether diols which are conventional starting materials for polyurethanes.

German Offenlegungsschrift No. 3,041,673 (European Patent Application 52,295) describes a process for the preparation of monoanhydrotetritols or mono- and-/or bis-anhydrohexitols by a solvent-free reaction of tetritols or hexitols in the presence of ion-exchange resins at temperatures below 160° C., optionally under vacuum. This disclosure also describes the use of such anhydrous sugar alcohols as starting materials for chemical syntheses of materials such as polyurethanes.

The publication by H. U. Woelk in Nachr. Chem. Tech. Lab. 30, 204–206 (1982) also describes the use of cyclic diols (e.g., anhydrous compounds of sorbitol) as interesting components for the synthesis of polyesters and polyurethanes.

The use of short chain diols as chain lengthening agents for the production of polyurethane plastics is well known. Certain combinations of isocyanates and chain lengthening agents, as described, for example, in Kunststoff-Handbuch, Volume VII, Vieweg-Höchtlen, Carl-Hanser-Verlag, Munich, 1966, on pages 206 et seq, have proven to be particularly suitable for the production of polyurethanes with good physical properties. Such combinations include the 1,5-diisocyanatonaphthalene/1,4-butanediol system and the 4,4'-diisocyanato-diphenylmethane/hydroquinone-(2-hydroxyethyl)-ether system. The use of 2,3-butanediol as chain lengthening agent in conjunction with 1,5-diisocyanatonaphthalene is also known to produce high quality polymer products.

The high reactivity of conventional chain lengthening agents results in very short pot lives, especially in systems containing a high proportion of hard segments (high diisocyanate content in the starting mixture). Consequently, systems in which such chain lengthening agents are employed are often difficult to work up into shaped products. In addition, the large amount of heat evolved where the reaction is too rapid may result in a finished, shaped product which is not completely homogeneous. A chain lengthening agent may thus adversely affect the quality of the product.

These disadvantages may be overcome to a large extent by use of 1,4-3,6-dianhydro-hexitols as chain lengthening agents (see German Offenlegungsschrift No. 3,111,093). If the typical chain lengthening agents (e.g., butanediol) are completely replaced by 1,4-3,6-dianhydro-hexitols in casting elastomer systems based on naphthylene-1,5-diisocyanate, the polyurethanes obtained are markedly superior in some of their characteristics, such as tear propagation resistance and structural strength. However, molded polyurethane products prepared with 1,4-3,6-dianhydro-hexitols as chain lengthening agents have a relatively high shrinkage and are difficult to produce in the exact dimensions wanted.

SUMMARY OF THE INVENTION

It is an object of the present invention to provide a process for the production of polyurethane elastomers.

It is also an object of the present invention to provide a process for the production of polyurethanes and polyurethane ureas which may be processed thermoplastically in moderate casting reaction times.

It is another object of the present invention to provide a process for the production of low shrinkage elastomers useful as casting compounds and in textile coatings.

These and other objects which will be apparent to those skilled in the art are accomplished by reacting an organic polyisocyanate with a compound having at least two groups containing isocyanate reactive hydrogen atoms and a molecular weight within the range of 400 to 10,000 and a 1,4-monoanhydro-tetritol. Known chain lengthening agents, auxiliaries and additives may also be included in the reaction mixture. The reactants may be reacted in accordance with techniques known to those in the art.

DETAILED DESCRIPTION OF THE INVENTION

Polyurethane elastomers with a pot life which can be adjusted within wide limits during their preparation having advantageous physical characteristics such as substantially improved shrinkage characteristics may be obtained by known one-stage or multi-stage processes if 1,4-monoanhydro-tetritols are used as chain lengthening agents.

It is surprising to find that when 1,4-3,6-dianhydrohexitols are replaced by 1,4-monoanhydro-tetritols in elastomer systems, particularly in casting elastomer systems and thermoplastic PU elastomers, the shrinkage characteristics of the molded polyurethane products produced from these elastomers are substantially improved. In view of the similarity of structure between the chain lengthening agents used according to the invention and the known dianhydrohexitols, this result was not expected.

Another technical advantage of the chain lengthening agents employed in the process of the present invention is that they are liquid at room temperature so that neither melting prior to application nor continuous heating is required.

The present invention relates to a process for the preparation of polyurethane elastomers, particularly casting elastomers and thermoplastic polyurethane elastomers. These elastomers are made by reacting an organic polyisocyanate with a relatively high molecular weight compound within the molecular weight range of from 400 to 10,000 having at least two groups containing isocyanate reactive hydrogen atoms and a 1,4-monoanhydro-tetritol. Low molecular weight chain lengthening agents within the molecular weight range of from 62–399 having at least two groups which contain isocyanate reactive hydrogen atoms, catalysts and other known additives may optionally be included in the reaction mixture. The reaction may be carried out by one-shot or isocyanate prepolymer techniques. 1,4-monoanhydro-tetritols may be used as the only chain lengthening agents or in admixture with other conventional chain lengthening agents, preferably in admixture with diol chain lengthening agents.

Polyisocyanates which may be used in the process of the present invention include: aliphatic, cycloaliphatic, araliphatic and aromatic diisocyanates such as those described, for example, by W. Siefken in Justus Liebigs Annalen der Chemie, 562, pages 75-136; for example, those corresponding to the formula Q(NCO)$_n$ wherein n=2 to 4 (preferably 2) and Q represents an aliphatic hydrocarbon group having 2 to 18 (preferably 6 to 10) carbon atoms, a cycloaliphatic hydrocarbon group having 4 to 15 (preferably 5 to 10) carbon atoms, an aromatic hydrocarbon group having 6 to 15 (preferably 6 to 13) carbon atoms, or an araliphatic hydrocarbon group having 8 to 15 (preferably 8 to 13) carbon atoms. Specific examples of such polyisocyanates are: hexamethylene-1,6-diisocyanate; dodecane-1,12-diisocyanate; cyclohexane-1,3- and -1,4-diisocyanate and any mixtures of these isomers; 1-isocyanato-3,3,5-trimethyl-5-isocyanatomethyl-cyclohexane; lysine ester diisocyanates; hexahydrotolylene-2,4- and -2,6-diisocyanate and any mixtures of these isomers; hexahydrophenylene-1,3- and/or -1,4-diisocyanate, perhydro diphenylmethane-2,4'- and/or 4,4'-diisocyanate and any stereoisomeric mixtures thereof; and especially aromatic diisocyanates such as phenylene-1,3- and -1,4-diisocyanate; tolylene-2,4- and -2,6-diisocyanate and any mixtures of these isomers; diphenylmethane-2,4'- and/or -4,4'-diisocyanate; 3,3'-dimethyl-4,4'-diisocyanatobiphenyl, and naphthylene-1,5-diisocyanate. Any mixtures of the above-mentioned polyisocyanates may also be used.

Other suitable polyisocyanates (particularly diisocyanates) are described in German Offenlegungsschrift No. 2,920,501 (pages 13 to 16).

Preferred polyisocyanates are hexamethylene diisocyanate, isophorone diisocyanate and dicyclohexylmethane-4,4'- and/or 2,4'-diisocyanates, and the commercially readily available aromatic polyisocyanates such as tolylene-2,4- and -2,6-diisocyanate and any mixtures of these isomers (TDI), polyphenyl-polymethylene polyisocyanates (such as those prepared by anilineformaldehyde condensation followed by phosgenation (crude MDI), diphenylmethane-4,4'-diisocyanate optionally in admixture with its 2,4'- and/or 2,2'-isomers, 3,3'-dimethyl-4,4'-diisocyanatobiphenyl (TODI) and naphthylene-1,5-diisocyanate. Diphenylmethane-4,4'-diisocyanate, 3,3'-dimethyl-4,4'-diisocyanatobiphenyl and naphthylene-1,5-diisocyanate are particularly preferred.

The compounds containing at least two groups with isocyanate reactive hydrogen atoms and having a molecular weight of from 400 to 10,000 include relatively high molecular weight compounds containing hydroxyl, amino, thiol and/or carboxyl groups. Relatively high molecular weight compounds containing hydroxyl groups, in particular compounds having 2 to 8 hydroxyl groups, and especially those with molecular weights from 600 to 10,000 (preferably from 1000 to 7000) are preferred. Examples of these preferred materials are relatively high molecular weight polyesters, polyethers, polythioethers, polyacetals, polycarbonates and polyester amides having at least 2, preferably 2 to 3 hydroxyl groups, such as those conventionally used for the production of both homogeneous and cellular polyurethanes.

Suitable polyesters containing hydroxyl groups include the reaction products of polyhydric (preferably dihydric) alcohols, optionally with the addition of trihydric and tetrahydric alcohols, and polybasic (preferably dibasic) carboxylic acids, polycarboxylic acid anhydrides or the corresponding polycarboxylic acid esters of lower alcohols. The polycarboxylic acids may be aliphatic, cycloaliphatic, aromatic and/or heterocyclic and they may be substituted, e.g. by halogen atoms, and/or unsaturated.

Examples of such polycarboxylic acids and derivatives thereof are: adipic acid, sebacic acid, phthalic acid, phthalic acid anhydride, tetrahydro- and hexahydrophthalic acid anhydride, isophthalic acid, trimellitic acid, maleic acid anhydride, dimerized and trimerized unsaturated fatty acids, dimethylterephthalate and terephthalic acid-bis-glycol ester.

Suitable polyhydric alcohols include ethylene glycol, propane-1,2- and/or -1,3-diol, butane-1,4- and/or -2,3-diol, hexane-1,6-diol, neopentyl glycol, 1,4-bis-hydroxymethylcyclohexane, 2-methyl-propane-1,3-diol, glycerol, trimethylolpropane, hexane-1,2,6-triol, pentaerythritol, quinitol, mannitol and sorbitol, formitol, methylglycoside, and di-, tri-, tetra- and higher diols of polyoxyethylene, polyoxypropylene and polyoxybutylene having molecular weights of up to 399.

The polyesters may contain a proportion of carboxyl end groups. Polyesters of lactones (e.g., ε-caprolactone) or hydroxycarboxylic acids (e.g., ε-hydroxycaproic acid) may also be used.

The polyesters useful in the practice of the present invention which have at least 2, generally 2 to 8, preferably 2 or 3 hydroxyl groups are known. Appropriate polyethers may be prepared, for example, by the polymerization of tetrahydrofuran and/or epoxides (such as ethylene oxide, propylene oxide, butylene oxide, styrene oxide or epichlorohydrin) either on their own (e.g., in the presence of Lewis catalysts) or by chemical addition of these epoxides (preferably ethylene oxide and propylene oxide) optionally as mixtures or successively, to starting components containing reactive hydrogen atoms. Examples of starting components containing reactive hydrogen atoms are: water; ammonia; alcohols such as ethylene glycol, propylene glycol, diethylene glycol, dimethylolpropane, glycerol, sorbitol, sucrose, formitol, formose and 4,4'-dihydroxydiphenylpropane; and amines such as aniline; ethylene diamine and ethanolamine. Polythioethers, polybutadienes, polyacetals, polycarbonates and polyester amides containing hydroxyl groups may also be used as starting materials.

Polyhydroxyl compounds containing high molecular weight polyadducts or polycondensates or polymers in a finely dispersed or dissolved form may also be used in the process of the present invention. Such polyhydroxyl compounds may be obtained, for example, when polyaddition reactions (e.g., reactions between polyisocyanates and aminofunctional compounds) or polycondensation reactions (e.g., between formaldehyde and phenols and/or amines) are carried out in situ in the above-mentioned hydroxyl group-containing compounds.

Polyhydroxyl compounds modified by vinyl polymers, such as the compounds obtained by polymerization of styrene and/or acrylonitrile in the presence of polyethers or polycarbonate polyols, are also suitable for the process of the present invention.

Other examples of the above-mentioned relatively high molecular weight polyhydroxyl compounds to be used in the process of the present invention are given in High Polymers, Vol. XVI, "Polyurethanes, Chemistry and Technology" by Saunders-Frisch, Interscience Publishers, New York, London, Vol. I, 1962, pages 32 to 42 and pages 44 to 54 and Vol. II, 1964, pages 5 to 6 and 198 to 199; in Kunststoff-Handbuch, Volume VII, Vieweg-Höchtlen, Carl-Hanser-Verlag, Munich, 1966, e.g. on pages 45 to 71, and particularly in German Offenlegungsschrift No. 2,920,501 on pages 17 to 24. Mixtures of the above-mentioned compounds (e.g., mixtures of polyethers and polyesters) may, of course, also be used. Polyhydroxyl compounds already containing urethane or urea groups and modified or unmodified natural polyols such as castor oil may also be used.

Relatively high molecular weight di- or polyaminopolyethers and di- or polyamino-polyesters such as those obtained by the process described in German Offenlegungsschrift No. 2,948,419 may also be used as component b).

The chain lengthening agents required in the process of the present invention include compounds from the 1,4-monoanhydro-tetritol series, i.e. 1,4-monoanhydro-erythritol and/or 1,4-monoanhydro-threitol. 1,4-monoanhydro-tetritols are represented by the formula

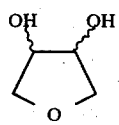

It is preferred to use the commercially readily available 1,4-monoanhydroerythritol:

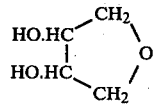

1,4-monoanhydro-tetritols may also be referred to as "1,4-anhydro-tetritols". These chain lengthening agents may be prepared by known methods.

The 1,4-monoanhydro-tetritol chain lengthening agents used in the process of the present invention may, of course, also be used in the form of mixtures of the two 1,4-monoanhydro-tetritols in any proportions but preferably contain at least 20 wt. % of monoanhydro-erythritol.

Mixtures of one or more than one monoanhydro-tetritol with other short chain compounds in the molecular weight range of from 62 to 399 (preferably from 62 to 250) containing 2 to 8 (preferably 2 to 4, most preferably 2) groups with isocyanate-reactive hydrogen atoms (i.e., so-called chain lengthening agents) may also be used in the process of the present invention.

Examples of such chain lengthening agents containing hydroxyl groups and/or amino groups and/or thiol groups and/or carboxyl groups (preferably hydroxyl groups and/or amino groups) are: low molecular weight polyols and/or amino alcohols with molecular weights of from 62 to 399 (preferably from 62 to 250) such as ethylene glycol; (1,2)- and (1,3)-propanediol, (1,4)- and (2,3)-butanediol; (1,5)-pentanediol; (1,6)-hexanediol; (1,8)-octanediol; neopentyl glycol; 1,4-bis-hydroxymethyl-cyclohexane; 2-methyl-(1,3)-propanediol; dibromobutenediol; dianhydro-hexitols; trimethylolpropane; (1,2,6)-hexanetriol; trimethylolethane; pentaerythritol; quinitol; mannitol and sorbitol; castor oil; di-, tri-, tetra- and higher polyoxyethylene-, polyoxypropylene- and polyoxybutylene-glycols with molecular weights of up to 399; di-, tri- and higher polyoxypropylene glycols with molecular weights of up to 399; di-, tri- and higher polybutylene glycols with molecular weights of up to 399; 4,4'-dihydroxydiphenylpropane; dihydroxyethyl-hydroquinone; ethanolamine; diethanolamine; N-methyl-diethanolamine; triethanolamine and 3-aminopropanol.

Examples of diamines which may be used as chain lengthening agents include 1-amino-3,3,5-trimethyl-5-aminomethyl cyclohexane and perhydro-2,4'-and -4,4'-diaminodiphenylmethane. Hydrazine and substituted hydrazines and acid dihydrazides may also be used. To control their reactivity, the amino groups may be partly or completely blocked by $CO_2$ in the form of their carbonates or by aldimine or ketimine groups.

The following are examples of preferred aromatic diamine chain lengthening agents: bisanthranilic acid esters; 3,5- and 2,4-diaminobenzoic acid esters; diamines containing ester groups; diamines containing ether groups; 2-halogen-1,3-phenylenediamines optionally substituted in the 5-position; 3,3'-dichloro-4,4'-diaminodiphenylmethane; tolylene diamines; 3,3'-diethyl-5,5'-diisopropyl-diphenylmethane; 4,4'-diaminodiphenylmethane; 4,4'-diaminodiphenylsulfide; diaminodiphenyldithioethers; diaminobenzene phosphonic acid esters; aromatic diamines containing sulfonate or carboxylate groups; and the high melting diamines disclosed in German Offenlegungsschrift No. 2,635,400. Aminoalkylthioanilines are examples of suitable aliphatic-aromatic diamines. Polyamines obtainable by the saponification of aromatic polyisocyanates and/or short-chain isocyanate prepolymers are also suitable. For some purposes, it is advantageous to use polyols containing sulfonate and/or phosphonate groups, preferably the adduct of bisulphite and butane-1,4-diol or the alkoxylation products thereof. Additional examples of chain-lengthening agents are given in German Offenlegungsschrift No. 2,920,501, pages 25 to 29.

Compounds which are monofunctional in their reaction with isocyanates may also be included as socalled chain breakers in proportions of from 0.01 to 10 wt. % (based on the polyurethane solid content). Examples of such monofunctional compounds are monoamines such as butylamine and dibutylamine, stearylamine, N-methyl-stearylamine, piperidine and cyclohexylamine; and monohydric alcohols such as butanol, 2-ethyl-hexanol, dodecanol, ethylene glycol monoethylethers and diisopropylcarbinol.

Mixtures of the monoanhydro-tetritols with low molecular weight aromatic diamines and/or diols are preferred, especially mixtures with diols in which the proportion of monoanhydro-tetritols amounts to more than 50 mol % of the chain lengthening agents.

Although the use of monoanhydro-tetritols and mixtures thereof affords the advantage of a longer pot life, it may be advantageous to include auxiliary agents and additives such as catalysts, blowing agents and surface active additives, reaction retarders, cell regulators, pigments, dyes, flame retarding agents, stabilizers, plasticizers and fillers in the reaction mixture.

Catalysts for the reaction between hydroxyl groups and isocyanate groups are well known to those skilled in polyurethane chemistry. Examples of appropriate catalysts include: tertiary amines such as triethylamine, N-tetramethyl-ethylenediamine, 1,4-diazabicyclo-(2,2,2)-octane, N,N-dimethyl-benzylamine, N-methyl-N'-dimethylaminoethylpiperazine, pentamethyldiethylene triamine; the Mannich bases of secondary amines known to act as catalysts, such as dimethylamine; aldehydes (formaldehyde); ketones (acetone); phenols; and silaamines with carbon-silicon bonds, e.g. 2,2,4-trimethyl-2-silamorpholine and 1,3-diethyl-aminomethyl-tetramethyl-disiloxane. Organic metal compounds may also be used as catalysts. Examples of such compounds include: organic tin compounds, e.g. tin-(II) acetate, tin-(II) ethyl hexoate and tin-(IV) compounds such as dibutyl tin dichloride, dibutyl tin dilaurate and dibutyl tin maleate. Other suitable catalysts are disclosed in German Offenlegungsschrift No. 2,920,501, on page 29, line 5 to page 31, line 25.

When used, the catalysts are preferably employed in a quantity of from 0.001 to 10 wt. % (based on the total weight of polyisocyanate, isocyanate reactive compound, chain lengthening agent(s) and auxiliary agents and additives). The catalysts may, of course, be used as mixtures. Tin-(II) carboxylic acid salts, triethylenediamine and titanic acid esters are particularly suitable catalysts.

Other additives which may be used in the process of the present invention include reaction retarders (e.g., substances which are acid in the reaction such as hydrochloric acid or organic acid halides); known cell regulators such as paraffins or fatty alcohols or dimethylpolysiloxanes; pigments; dyes; flame-retarding agents of known type such as tris-chloroethylphosphate, tricresylphosphate and ammonium phosphate and polyphosphate; stabilizers against ageing and weathering; plasticizers; fungistatic and bacteriostatic substances; and fillers such as barium sulfate, kieselguhr, carbon black or whiting.

Suitable organic blowing agents include acetone; ethyl acetate; halogen substituted alkanes such as methylene chloride, chloroform, ethylidene chloride, vinylidene chloride, monofluorotrichloromethane, chlorodifluoromethane and dichlorodifluoromethane; and butane, hexane, heptane and diethylethers. The effect of a blowing agent may also be obtained by the addition of compounds which decompose at temperatures above room temperature to release gases, e.g. compounds releasing nitrogen.

Further examples of blowing agents and details concerning the use of blowing agents and the methods to be applied may be found in Kunststoff-Handbuch, Volume VII, published by Vieweg and Höchtlen, Carl-Hanser-Verlag, Munich, 1966, e.g. on pages 108 and 109, 453 to 455 and 507 to 510 and in DE-OS 2,920,501. Cellular polyurethane elastomers (density within the range of about 0.3 to 1.25 g/cm$^3$, preferably 0.6 to 1.2 g/cm$^3$) may also be prepared with the aid of blowing agents, possibly with the addition of small quantities of water.

Surface-active additives such as emulsifiers and foam stabilizers may also be used in the practice of the present invention. Suitable emulsifiers include the sodium salts of ricinoleic sulfonates and salts of fatty acids with amines, such as oleic acid diethylamine or stearic acid diethanolamine. Alkali metal and ammonium salts of sulfonic acids, such as dodecylbenzene sulfonic acid or dinaphthylmethane disulfonic acid, or of fatty acids such as ricinoleic acid or of polymeric fatty acids may also be used as surface-active additives. Polyether siloxanes, and especially those which are water-soluble, are particularly effective additives for regulating, preferably increasing pouring time. These compounds generally have the structure of a copolymer of ethylene oxide and propylene oxide attached to a polydimethylsiloxane group. Foam stabilizers of this type have been described, for example, in U.S. Pat. Nos. 2,834,784; 2,917,480 and 3,629,308 and in German Patent Application P 3 233 086.

Examples of surface-active additives, reaction retarders, stabilizers, flame-retarding substances, plasticizers, dyes, fillers and fungistatic and bacteriostatic substances optionally used in the present invention and details concerning the use and mode of action of these additives may be found in Kunststoff-Handbuch, Volume VII, published by Vieweg and Höchtlen, Carl-Hanser-Verlag, Munich, 1966, e.g. on pages 103 to 113, and in German Offenlegungsschrift No. 2,920,501, page 32.

The process of the present invention may be carried out by reacting the components in accordance with a known one-shot process or prepolymer process or semi-prepolymer process. Appropriate mechanical devices include those described in U.S. Pat. No. 2,764,565. Details concerning processing apparatus which may be used for the purpose of the invention may be found in Kunststoff-Handbuch, Volume VII, published by Vieweg and Höchtlen, Carl-Hanser-Verlag, Munich, 1966, e.g. on pages 121 to 247.

The quantities of reactants used in the process of the present invention are generally chosen so that the NCO/XH ratio of polyisocyanate to chain-lengthening agent plus high molecular weight isocyanate-reactive compound is in the range of from 0.9 to 1.5, preferably from 0.90 to 1.25 and most preferably from 0.95 to 1.20 (depending upon the particular method employed). XH represents a group with reactive hydrogen atoms, e.g. a hydroxyl, mercapto, amino or carboxyl group. If a prepolymer process is employed, the NCO content of the prepolymer may be from 1 to 20 wt. %, preferably from 2 to 13 wt. %.

In one embodiment of the process of the present invention, the relatively high molecular weight isocyanate-reactive compound mixed with chain-lengthening agent is reacted with an excess of diisocyanate. The reaction product is then granulated and shaped under heat and pressure. Polyurethane products with varying degrees of rigidity and elasticity (depending upon the quantitative proportions of reactants employed) may be obtained by this method. This method may also be used to produce polymer products which can be worked up like thermoplasts.

In another embodiment of the process of the present invention, a mixture of the relatively high molecular weight isocyanate-reactive compound containing at least two hydroxyl groups and the chain lengthening agent(s) is reacted with a subequivalent amount of diisocyanate to produce a sheet which is capable of being rolled and which may subsequently be converted into a rubbery elastic polyurethane, e.g. by cross-linking with a further quantity of diisocyanate.

Elastomers prepared by the process of the present invention are versatile in their possible applications. These elastomers may, for example, be used for molded products which are subjected to severe mechanical wear in use, such as rollers, cone belts or seals which are subjected to severe thermal or chemical wear, hot water pipes or motors or the production of foils, textile coatings and polyurethane powders. Cellular polyurethanes (flexible to rigid) may be produced as well as homogeneous elastomers.

The following Examples serve to illustrate the process of the present invention. The numerical values given in these Examples are to be understood as parts by weight or percentages by weight, unless otherwise indicated.

EXAMPLES

EXAMPLE 1

100 Parts by weight of a polyester of butane-1,4-diol and adipic acid (OH number 49.1) were stirred together with 1 part by weight of 2,6-2',6'-tetraisopropyldiphenyl carbodiimide, 0.8 parts by weight of the bis-stearoylamide of ethylene diamine, 40 ppm of tin-(II) octoate and 10 parts by weight of 1,4-monoanhydroerythritol at 120° C. 36.1 Parts by weight of 4,4'-diisocyanatodiphenylmethane (ratio of NCO to total OH groups=1.03:1) were heated to 60° C. and added with vigorous stirring to the above solution which was at a temperature of 130° C. The reactive mixture was then poured out on a metal plate covered with separating wax. The mixture very rapidly solidified and could be removed after only about 6 minutes. The polymer was then size reduced in cutting mills and after 2 to 4 days it was injection molded to form shaped products which were then tempered for 17 hours at 80° C. These products had the properties shown in Table 1.

It was particularly striking that plates 2 mm in thickness showed virtually no shrinkage after they had been tempered.

This product according to the invention was found to have a recoil elasticity of 36%, as compared with a thermoplastic polyurethane which had been chain-lengthened with butane-1,4-diol (see Comparison Example 3). Such a recoil elasticity is desirable for applications such as a textile coating (leather-like, pleasant handle). The pressure deformation residue of this product at room temperature was low.

EXAMPLE 2

(Comparison)

When 1,4-3,6-dianhydrosorbitol is used as chain-lengthening agent, solidification takes much longer and is therefore uneconomical. Moreover, the shrinkage of molded products during tempering is very high. For this reason, butane-1,4-diol adipic acid polyester was replaced by an adipic acid polyester of butane-1,4-diol/ethane diol. 100 Parts by weight of a butane-1,4-diol/ethane diol-adipic acid polyester (OH number 56.6) were stirred together with 0.8 parts by weight of the bis-stearoylamide of ethylene diamine, 1.0 part by weight of 2,6-2',6'-tetraisopropyl-carbodiimide, 40 ppm of tin-(II) octoate and 12 parts by weight of dianhydrosorbitol at 130° C. 33.9 Parts by weight of 4,4'-diisocyanatodiphenylmethane (ratio of NCO to OH groups=1.03:1) were heated to 60° C. and added with vigorous stirring to the solution which was at a temperature of 130° C. The procedure was then continued as described in Example 1. One striking difference between the product of this Example and that of Example 1 was the longer solidification time, of about 15 minutes, before the product could be removed from the plate. In addition, the product of this Example had a relatively high shrinkage of 7% (see Table 1), which is undesirable for many applications. The other properties of this product are given in Table 1.

EXAMPLE 3

(Comparison)

100 Parts by weight of a polyester of butane-1,4-diol and adipic acid (OH number 49.1) were stirred together with 0.8 parts by weight of the bis-stearoylamide of ethylene diamine, 1.0 part by weight of 2,6-2',6'-tetraisopropyl-carbodiimide, 0.002 parts by weight of Sn-II-octoate and 8 parts by weight of butane-1,4-diol at 130° C. 34.2 Parts by weight of 4,4'-diisocyanatodiphenylmethane (ratio of NCO to OH groups=1.03:1) were heated to 60° C. and added with vigorous stirring to the solution which was at 120° C. The procedure was then continued as described in Example 1. The solidification time required before the product could be removed from its mold was 10 minutes. For further data, see Table 1.

This product had a rather high recoil elasticity, which is undesirable for certain purposes (e.g., textile coatings, composite glass foils).

EXAMPLE 4

100 Parts by weight of a polyester of butane-1,4-diol and adipic acid (OH number 49) were stirred together with 1 part by weight of 2,6,2',6'-tetraisopropyl-diphenylcarbodiimide, 0.8 parts by weight of the bis-stearoylamide of ethylenediamine, 40 ppm of tin-(II) octoate, 10 parts by weight of 1,4-monoanhydro-erythritol and 1 part by weight of butane-1,4-diol at 120° C. 38.9 Parts by weight of 4,4'-diisocyanatodiphenylmethane (proportion of NCO to OH=1.03:1) were heated to 80° C. and added with vigorous stirring to the solution which was at a temperature of 130° C. The procedure was then continued as described in Example 1. The reactive mixture was removed from the plate after 9 minutes. The data given in Table 1 were determined on the injection molded and tempered product. The product had satisfactory strength and resistance properties and relatively low shrinkage.

EXAMPLE 5

250 Parts of a polyester with an average molar mass of 2000 (OH number 56) obtained from adipic acid, butane-1,4-diol and ethylene glycol (molar ratio of diols 1:1) were dehydrated at 130° C. under a vacuum of about 40 mbar and then maintained at 140° C.

100 Parts of 1,5-diisocyanatonaphthalene were then added. When the exothermic reaction was completed, 32.5 parts of monoanhydro-erythritol were added to the isocyanate prepolymer with vigorous stirring (at about 130° C.). The reaction mixture was stirred for 60 seconds and then poured into a mold which had been preheated to 110° C. The mixture remained pourable for about 25 minutes and solidified after about 60 minutes. It was then tempered for 24 hours at 110° C.

The finished elastomer had the properties indicated in Table 1. Its tear propagation resistance (according to Graves) was 81 KN/m.

Here again, the recoil elasticity, amounting to 35%, was found to be low compared to that of elastomers which had been chain-lengthened with butane-1,4-diol (about 50%).

TABLE 1

| Properties | Unit of measurement | Test standard | Example No. 1 | (Comparison) 2 | (Comparison) 3 | 4 | 5 |
| --- | --- | --- | --- | --- | --- | --- | --- |
| Shrinkage in the longitudinal direction of plates measuring 125 × 65 × 2 mm after 17 h, at 80° C. | % | | 0.4 | 7 | 4 | 0.8 | 0.9 |
| Tensile stress | MPa | DIN 53504 | 35 | 28 | 32 | 46 | 40 |
| Elongation at break | % | DIN 53504 | 618 | 510 | 702 | 638 | — |
| Shore hardness A | — | DIN 53505 | 78 | 73 | 78 | 80 | 95 |
| Shore hardness D | — | — | — | — | — | — | 43 |
| Recoil elasticity | % | DIN 53512 | 36 | 42 | 46 | 33 | 35 |
| Pressure deformation residue 70 h, 20° C. | % | DIN 53517 | 17 | 19 | 28 | — | — |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of polyurethane elastomers comprising reacting:
   (a) an organic polyisocyanate with
   (b) a compound having at least two groups containing isocyanate-reactive hydrogen atoms and a molecular weight within the range of 400 to 10,000 and
   (c) a 1,4-monoanhydro-tetritol.

2. The process of claim 1 in which component (c) is 1,4-monoanhydro-erythritol.

3. The process of claim 1 in which component (c) is 1,4-monoanhydro-erythritol in admixture with 1,4-monoanhydro-threitol.

4. The process of claim 1 in which component (c) is a mixture of 1,4-monoanhydro-erythritol and 1,4-monoanhydro-threitol containing at least 20 wt. % 1,4-monoanhydro-erythritol.

5. The process of claim 1 in which (d) a chain-lengthening agent having at least two groups containing isocyanate-reactive hydrogen atoms and having a molecular weight of from 62 to 399 other than a 1,4-monoanhydro-tetritol is employed.

6. The process of claim 5 in which the chain-lengthening agent (d) is a diol or an aromatic diamine.

7. The process of claim 5 in which at least 50 mol % of the total of monoanhydro-tetritol and chain-lengthening agent (d) is a monoanhydro-tetritol.

8. The process of claim 1 in which a material selected from the group consisting of catalysts, blowing agents, reaction retarders, cell regulators, pigments, dyes, flame retarding agents, emulsifiers, stabilizers, plasticizers, fillers, fungistatic and bacteriostatic substances and mixtures thereof is employed.

* * * * *